United States Patent [19]
Cairns et al.

[11] 4,314,259
[45] Feb. 2, 1982

[54] APPARATUS FOR PROVIDING AN ARRAY OF FINE LIQUID DROPLETS PARTICULARLY SUITED FOR INK-JET PRINTING

[75] Inventors: Walter J. Cairns, Marblehead; Curtis P. Van Vloten, Cambridge, both of Pa.

[73] Assignee: Arthur D. Little, Inc., Cambridge, Mass.

[21] Appl. No.: 159,799

[22] Filed: Jun. 16, 1980

[51] Int. Cl.³ .......... G01D 15/18
[52] U.S. Cl. .......... 346/75; 346/140 R
[58] Field of Search .......... 346/75, 140 IJ

[56] References Cited

U.S. PATENT DOCUMENTS

| | | | |
|---|---|---|---|
| 3,988,745 | 10/1976 | Sultan | 346/140 PD |
| 4,005,440 | 1/1977 | Amberntsson et al. | 346/140 PD |
| 4,057,807 | 11/1977 | Fischbeck et al. | 346/140 PD |
| 4,223,320 | 9/1980 | Paranjpe et al. | 346/75 |

OTHER PUBLICATIONS

Hermanrud, Bengt, The Compound Jet—A New Method to Generate Fluid Jets for Ink Jet Printing, Report 1/1981, Dept. of Electrical Measurements; Lund Institute of Technology; Lund, Sweden.

*Primary Examiner*—George H. Miller, Jr.

[57] ABSTRACT

Apparatus for forming an array of liquid streams which break up into small uniformly sized and spaced droplets. A cover plate is sealed to a base plate having grooves sized and spaced according to a predetermined pattern to define a plurality of nozzles. Manifold means are provided to supply liquid under pressure to the nozzles thus formed. In a preferred embodiment for ink-jet applications the nozzles, or manifold branches supplying the nozzles, are of such a configuration as to electrically isolate the liquid flowing therethrough and separate electrodes are provided for each nozzle. This makes it possible to use a common charging electrode for the array while exercising separate control over the droplet-forming streams.

32 Claims, 21 Drawing Figures

APPARATUS FOR PROVIDING AN ARRAY OF FINE LIQUID DROPLETS PARTICULARLY SUITED FOR INK-JET PRINTING

This invention relates to apparatus for providing an array of fine liquid streams which break up to form streams of fine liquid droplets. More particularly, this invention relates to apparatus for forming an array of fine liquid droplet streams suitable for ink-jet printing and to ink-jet printing apparatus incorporating the means for forming the array.

There are a number of techniques which require the deposition of a liquid in the form of droplets onto a receptor surface in a predetermined pattern. Among such techniques are ink-jet printing, specialized coating techniques such as electrostatic spraying and the like. Because ink-jet printing involves the use of very fine droplets accurately spaced and precisely controlled, it places the most stringent performance requirements on any apparatus using streams of fine liquid droplets. The application of the apparatus of this invention may, therefore, be conveniently illustrated in its application to ink-jet printing.

In recent years a great deal of effort has been devoted to the development of various methods and apparatus for utilizing ink-jets for different recording and printing purposes. In one form of ink-jet printing a liquid jet is ejected from a nozzle under high pressure so that it spontaneously breaks up at a so-called point of drop formation into essentially uniformly sized and spaced droplets. Selected ones of these droplets are then directed toward the recording paper. In ink-jet printing these droplets are charged by electric influence from a charging electrode which may enclose the point of drop formation and to which a signal voltage has been connected. The droplets are then caused to pass through droplet direction means which control the final disposition of the droplets, i.e., onto a predetermined location on the record sheet or into suitable liquid collection means. (See U.S. Pat. Nos. 3,416,513 and 3,596,275).

In the prior art there are disclosed a number of ink-jet recorders and printers having a plurality of capillaries or orifices arranged in a predetermined pattern or array, the purpose being to simultaneously print entire lines of alphanumerical characters or entire patterns on a suitable receptor. Exemplary of apparatus and method for printing entire lines are the so-called bar code printers as disclosed, for example, in U.S. Pat. No. 3,787,881. Exemplary of ink-jet array printers are those disclosed in U.S. Pat. Nos. 3,373,437, 4,014,029 and 4,069,486. Finally, it is known from the prior art to use a plurality of ink-jet nozzles in a converging array as disclosed, for example, in U.S. Pat. No. 3,848,258.

Ink-jet array printers have been proposed for a number of printing applications. For example, bar code printers are particularly suitable for printing labels and the like; while array printers offer the possibility of printing large areas of a receptor, e.g., an entire newspaper page, a width of a textile, including carpeting and the like, or a width of a wallpaper. Serious difficulties have, however, been encountered in achieving acceptable results in ink-jet array printing. One such difficulty arises from an inability to maintain a stable alignment of the ink-jet streams and consistent droplet size along with the attendant inability to continuously achieve good registration in printout. The primary reason for encountering this difficulty lies in the techniques used in constructing the nozzle arrays and in the resulting arrays formed.

In order to make an ink-jet array printer it is necessary to provide a plurality of nozzles which are not only accurately aligned but which are also of the same internal dimension. Misalignment will, of course, misdirect droplet streams not only relative to other droplet streams but also to the receptor surface; and variations in nozzle dimensions will cause variations, from stream to stream, in drop size, the location of the drop formation point and direction of the droplet stream.

There are in use, at the present time, two general techniques for forming the nozzle arrays necessary to make an ink-jet array printer. The first of these techniques comprises drilling a plurality of orifices through a metal or ceramic piece to form a nozzle plate. (See U.S. Pat. Nos. 4,112,435 and 4,153,901). It is very difficult to drill these orifices perfectly parallel to each other and perfectly spaced. Moreover, the orifices must be precisely sized and free of any internal roughness which will affect the character of the issuing liquid streams.

The second general technique for forming nozzle arrays comprises mounting a plurality of preformed capillaries, typically of glass, between two slotted plates or the like to attain the desired spacings. (See U.S. Pat. Nos. 4,112,436 and 4,122,460). As in the case of the nozzle plates having orifices drilled therethrough, this second technique presents serious problems in attaining the desired precise alignments of the capillaries and in providing capillaries within the necessarily very limited size range.

In some ink-jet systems using inks containing a highly volatile solvent it is possible for the nozzles to clog particularly if the ink-jet apparatus is periodically closed off. Such clogging or partial clogging of any one nozzle will, of course, destroy the perfect droplet alignment sought and it becomes necessary to periodically clean the nozzles to minimize this difficulty.

For many applications of ink-jet printing it is desirable, if not necessary, to be able to separately control the droplets of each stream. Normally this is accomplished by grounding the jets and applying signal voltages to a separate charging electrode for each stream. Such an arrangement presents serious spatial problems and limits the number of nozzles per unit area.

Finally, because of the great accuracy which must be achieved in both nozzle diameter and in nozzle-to-nozzle spacing, the construction of nozzle arrays either by drilling holes in an orifice plate or by preforming capillaries and aligning and affixing them in suitable mounting means is costly, particularly when the reject rate is high.

Many of these same problems are to be found in providing an array of fine liquid droplet streams for applications other than ink-jet printing. It would therefore be desirable to have an improved, reliable array apparatus for all such applications. Since ink-jet array printing has a number of important advantages for many printing applications, it would be particularly desirable to have available an improved ink-jet array printing apparatus.

It is therefore a primary object of this invention to provide improved apparatus for forming an array of fine liquid streams. It is another object of this invention to provide apparatus of the character described which is suitable for ink-jet array printing wherein the streams break up into droplets at predetermined drop formation points and means are provided to control the deposition of the droplets of the streams. A further object of this invention is to provide apparatus for forming an array of ink-jets, and more particularly one which permits separate control of the drops in each stream. Still another object is to provide such an apparatus forming an array of ink-jets which incorporates individual droplet control means within the array and thereby permits using a single common charging electrode for all of the streams.

A further object of this invention is to provide apparatus for forming an array of ink-jets which achieves uniformity of drop size and spacing from stream to stream as well as accurate stream alignment and spacing. It is an additional object to provide such an apparatus which is less expensive to manufacture and maintain than the presently used ink-jet array apparatus, and which is compact and flexible in form, structure and use.

Other objects of the invention will in part be obvious and will in part be apparent hereinafter.

The invention accordingly comprises the features of construction, combinations of elements and arrangement of parts which will be exemplified in the constructions hereinafter set forth, and the scope of the invention will be indicated in the claims.

For a fuller understanding of the nature and objects of the invention, references should be had to the following detailed description taken in connection with the accompanying drawings in which FIG. 1 is a perspective view of the elements, prior to assembly, making up one embodiment of the fine liquid stream array apparatus of this invention;

According to one aspect of this invention there is provided an apparatus for providing an array of fine liquid streams which break up at drop formation points to form steams of liquid droplets, comprising in combination base plate means having a plurality of grooves spaced according to a predetermined pattern in at least one contacting/sealing surface thereof; cover plate means engageable with the at least one surface of the base plate means to form with the grooves a plurality of nozzles extending along at least a portion of the length of the grooves; the base plate means and cover plate means being maintained in liquid sealing contact; and liquid manifold means communicating with the grooves to supply liquid under pressure to the nozzles.

According to another aspect of this invention there is provided a nozzle forming means for forming a nozzle of a size and configuration such that when a liquid is forced therethrough under pressure it forms a stream which breaks up at a drop formation point to form a stream of fine liquid droplets of a size, velocity and spacing suitable for ink-jet printing, comprising in combination a base plate having a contacting/sealing surface capable of forming a liquid seal with an engaging sealing surface; a groove in said base plate surface and having a cross sectional area ranging between about $2\times10^{-5}$ mm$^2$ and $8\times10^{-3}$ mm$^2$; and a cover plate providing the engaging sealing surface and arranged to define with the groove a nozzle; the base plate and cover plate being maintained in liquid sealing relationship thereby forming the nozzle.

According to yet another aspect of this invention there is provided an ink-jet array printing apparatus, comprising in combination array forming means to provide an array of fine liquid streams which break up at drop formation points to form streams of liquid droplets, the array forming means comprising base plate means having a plurality of grooves spaced according to a predetermined pattern in at least one contacting-/sealing surface thereof, cover plate means engageable with the at least one surface of the base plate means to form with the grooves a plurality of nozzles extending along at least a portion of the length of the grooves, the base plate and cover plate means being maintained in liquid sealing contact, and liquid manifold means communicating with the grooves to supply liquid under pressure to the receptor surface means; electrical signal source means; signal control means to impress an electrical charge on at least some of the droplets of the streams; and droplet directing electrode means to control the direction of travel and ultimate disposition of at least some of the droplets of each of the streams onto the receptor surface means.

Figure 1:
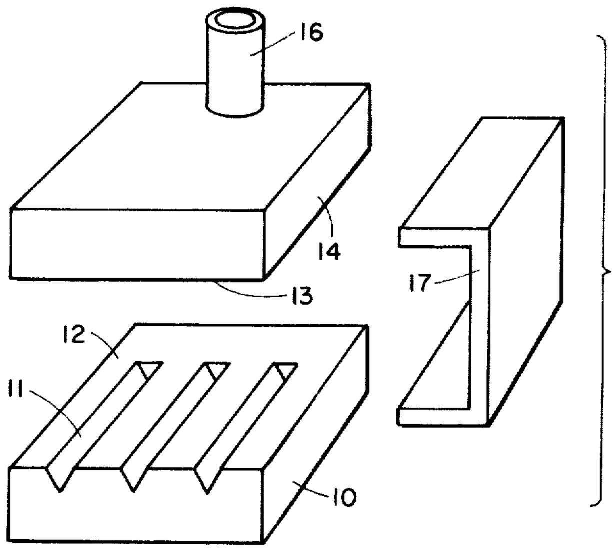
Figure 2:
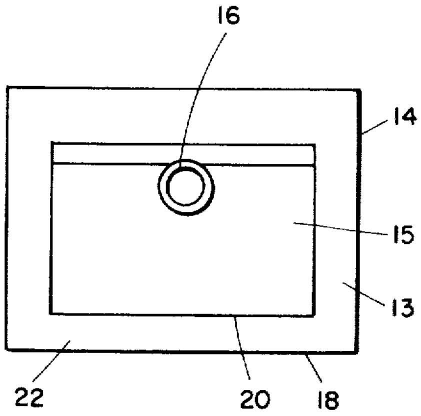
FIG. 2 is an elevational view of the contacting/sealing surface of the cover plate.
Figure 3:
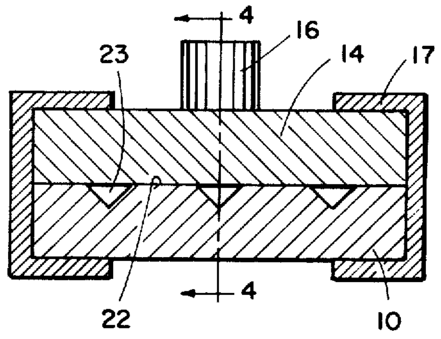
FIG. 3 is a cross section of the assembled array apparatus of FIG. 1 taken through plane 3—3 of FIG. 4.
Figure 4:
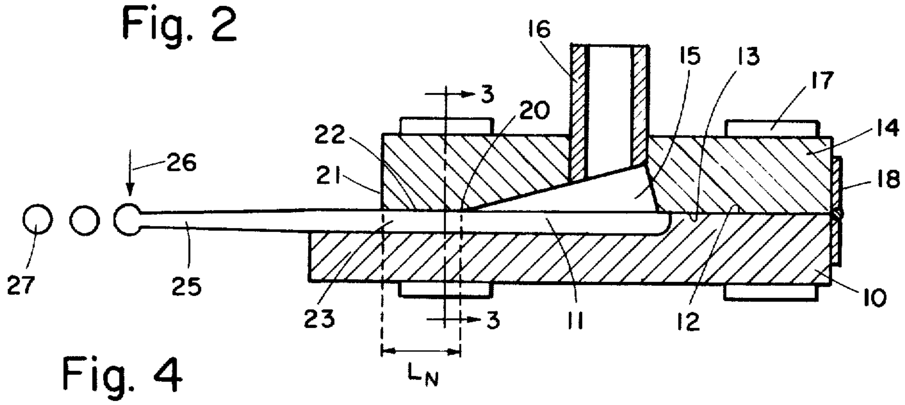
FIG. 4 is a cross section of the assembled array apparatus of FIG. 1 taken through plane 4—4 of FIG. 3.

FIGS. 1-4 illustrate one embodiment of the array apparatus of this invention, FIG. 1 showing the components prior to their assembly and FIG. 2 the under contacting/sealing side of the cover plate. A base plate 10 has grooves 11 cut or otherwise formed in contacting/sealing surface 12 which is of such a character as to permit the engaging/sealing surface 13 to cover plate 14 to contact it under applied force to seal the surfaces 12 and 13 against liquid leakage. As will be seen in FIGS. 2 and 3, cover plate 14 has cut in the under contacting-/sealing surface 13 a liquid manifold 15 which is of such dimensions as to provide liquid communication with grooves 11 when base plate 10 and cover plate 14 are assembled as shown in FIGS. 3 and 4. Manifold 15 is in communication with a source of liquid (not shown) through a liquid conduit 16, thereby making it possible to supply a liquid under pressure to all of grooves 11. When assembled, the cover plate and base plate may be held in sealing contact by any suitable means such as clamps 17 which may be adjustable to supply the necessary sealing force; and, if desired, the two plates may be joined by hinges 18 which make it easy to separate them for cleaning while maintaining their relative alignment. Alternatively, the two plates may be permanently sealed in any appropriate manner.

The forward edge 20 of manifold 15 stops short of the forward edge 21 of cover plate 14 to provide a sealing surface 22 which contacts the unnotched surface 12 of base plate 10. There are thereby provided nozzles 23 defined by the surface of grooves 11 and surface 13 of the cover plate. The length, $L_N$, of these nozzles is determined by the length of that portion 22 of surface 13 extending forward of manifold edge 20. As will be seen in FIG. 4, base plate 10 extends beyond forward edge 21 of cover plate 14 to provide a short extension of the base plate and hence of grooves 11. Under some circumstances this extension of the grooves is desirable to attain the desired alignment of the liquid streams 25 ejected through nozzles 23. It appears that the open groove extensions stabilize the liquid streams and allow the use of somewhat shorter nozzles and hence somewhat lower pressures.

As shown in FIG. 4, the liquid streams 25 break up at a drop formation point somewhat diagrammatically designated at 26 to form a stream of fine droplets 27, the alignment, size, spacing and direction of travel of which is determined by the nozzle 23 and the pressure under which the liquid is delivered by way of manifold 15 to grooves 11.

Figure 5:
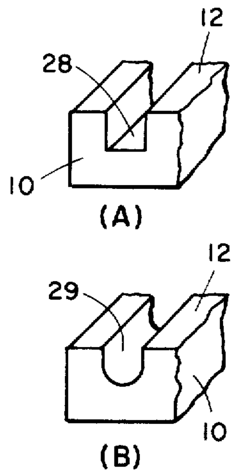
FIG. 5 illustrates in perspective two additional groove configurations.

The grooves 11 of FIGS. 1-4 are shown to be V-shaped. However, they may have other cross sectional configurations such as the rectangular groove 28 of FIG. 5(A) or U-shaped groove 29 of FIG. 5(B). Generally, V-shaped grooves, or an approximation thereof, are preferred since they present less surface (for a given height of groove) than other configurations and as a result they minimize surface friction as well as the possibilities of changing the direction of the emerging liquid streams. For ink-jet printing it is of course necessary for the groove surfaces to be smooth, for the grooves in any one array to be essentially equal in cross sectional area, as well as for the nozzles to be of equal length.

Although, as previously noted, the array apparatus of this invention may have applications other than in ink-jet printing, the dimensions of the grooves and nozzles and the operating parameters may be illustrated in terms of ink-jet printing useage. Normally, ink-jet printer nozzles (e.g., those required in the apparatus described in U.S. Pat. No. 3,416,513 or 3,596,275) range in diameter from about 5 to 100$\mu$. In the array apparatus of this invention, the cross sectional area of nozzles 11 should fall within essentially the same range as that for these prior art nozzles, i.e., between about $2\times10^{-5}$ to about $8\times10^{-3}$ mm$^2$. It has been found that V-shaped grooves about 1 mil ($2.54\times10^{-2}$ mm) in height are suitably sized for ink-jet printing.

In those ink-jet systems in which it is not necessary to separately control the droplets of each stream it will generally be desirable to use nozzles of a length which is essentially no longer than that required to stabilize the liquid streams and to give them the required direction of travel. In such cases, ratio of nozzle lengths, $L_N$, to nozzle height i.e., the aspect ratio, should preferably range between about 2 and about 10, the optimum value for any one array apparatus depending upon the presence or absence of an external groove extension, the liquid being used, the frictional forces generated in the nozzle and the magnitude of the pressure used in forcing the liquid through the nozzle. This optimum aspect ratio for any system of this type may readily be determined.

In those ink-jet systems in which it is necessary to separately control the droplets from each liquid stream it may be advantageous to form the nozzles of such a length as to develop in the liquid in the nozzles a sufficiently high resistance to achieve electrical isolation of each liquid stream. As will be described below in connection with FIGS. 14–20, such electrical isolation permits the use of separate electrodes for each of the nozzles and a common control electrode for the array.

In normal ink-jet printing, the pressure of the liquid being ejected through the nozzles ranges between about 2 and about 70 kg/cm$^2$ (between about 30 and about 1000 psi) to produce a liquid stream velocity ranging between about 10 and about 40 meters/second (between about 30 and about 120 feet/second). Although it is desirable to operate any ink-jet apparatus (or other apparatus producing a plurality of liquid streams) over the lower part of such a pressure range, it is even more desirable in the apparatus of this invention inasmuch as it is necessary to form sealing contact between surfaces 12 and 13 of the base and cover plates. Moreover, the cost of a liquid pump, along with hydraulic fittings, is directly determined by the liquid pressures it must be capable of delivering. Thus the desirability of operating with nozzles which minimize pressure drop while attaining the desired stability and direction of travel of the liquid ejected therefrom becomes apparent.

The base plate 10 and cover plate 14 may be formed of a suitable metal (e.g., aluminum, stainless steel and the like), of a synthetic plastic (e.g., nylon, polypropylene, polyethylene and the like); or of a rigid solid crystalline material (e.g., silicon) the surface of which may be etched along crystal faces to create the desired grooves. Well known techniques for polishing metal surfaces and for machining grooves in them may be employed. If synthetic plastics are used, they may be polished and machined or cast using appropriate molds. The ability to use such techniques as etching and/or molding is unique to the construction of the array apparatus of this invention. The actual number of grooves formed in any one base plate will depend upon the number of nozzles desired in the array commensurate with the ability to effect adequate holding of the plates in sealing contact. It is, of course, within the scope of this invention to form array modules and to use a plurality of such modules in constructing an ink-jet printing system.

For ink-jet printer usage, it is generally necessary to have from about 100 to 250 lines per inch (40 to 100 lines per centimeter). The spacings of grooves 11 must therefore be such as to attain the spacing of liquid streams to attain this requirement. If it is required to separately control the disposition of droplets 27 in each of the streams while maintaining such close spacing between the streams, it may be necessary to make some modifications in the manifold configuration as described below in conjunction with FIGS. 14–20.

Figure 6:
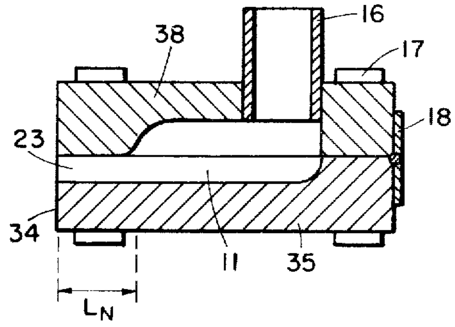
FIG. 6 is a cross section of a modification of the array apparatus of FIG. 4 in which the base plate terminates at the discharge end of the nozzle.

FIG. 6—13 illustrate other embodiments and modifications in the basic structure shown in FIGS. 1–4. In the structure of FIG. 6 the discharge edge 34 of base plate 35 is flush with edge 37 of cover plate 38 and the manifold 39 has an essentially rectangular cross section. In this embodiment, nozzle 23 preferably has a somewhat higher aspect ratio than in the embodiment of FIG. 4, since the attainment of stream stability must be realized solely by reason of its passing through nozzle 23.

Figure 7:
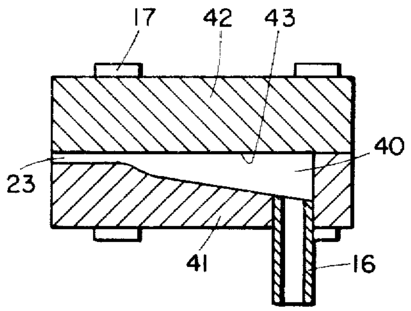
FIG. 7 is a cross section of another modification of the array apparatus of FIG. 4 in which the liquid manifold is cut in the base plate.
Figure 8:
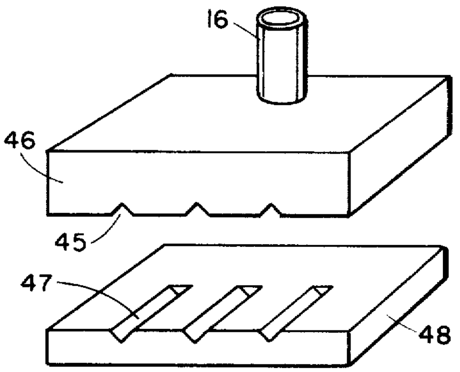
FIG. 8 is a perspective view of the elements, prior to assembly, making up another embodiment of the fine liquid stream array apparatus of this invention.
Figure 9:
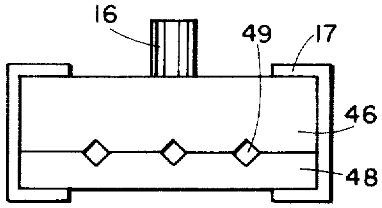
FIGS. 9 and 10 are front elevational and cross sectional views of the array apparatus embodiment of FIG. 8.
Figure 10:
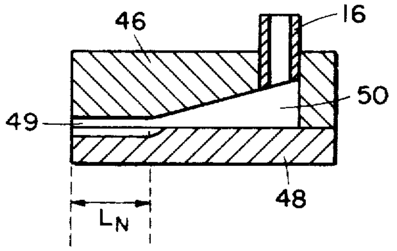

In the embodiment of FIG. 7, the entire length of the groove is used to form nozzle 23 since manifold 40 is cut in the base plate 41, leaving cover plate 42 to provide a flat contacting/sealing surface. In the embodiment of FIGS. 8–10, grooves 45 are cut in cover plate 46 to match grooves 47 in base plate 48 to provide nozzles 49 of symmetrical cross sectional shapes. The length of nozzles 49 is therefore essentially that of grooves 45 and 47. In this arrangement grooves 45 will extend to the forward end of manifold 50.

Figure 11:
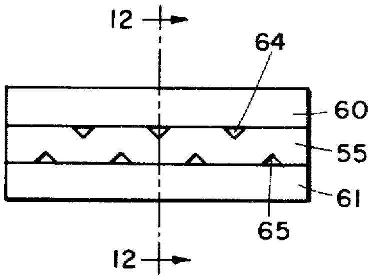
FIG. 11 is a front elevational view of an array apparatus of this invention showing the use of a single base plate to provide two separate rows of liquid streams.
Figure 12:
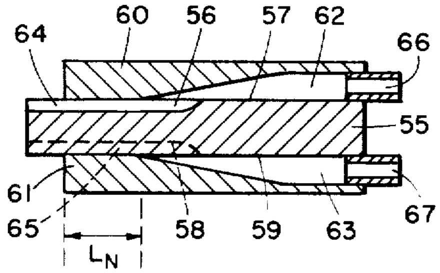
FIG. 12 is a cross section of the apparatus of FIG. 11 taken along plane 12—12 of FIG. 11.

The array apparatus of FIGS. 11 and 12 make it possible to provide liquid streams from a single array module which are vertically as well as horizontally spaced. Thus base plate 55 has grooves 56 cut in surface 57 and grooves 58 cut in the opposite surface 59. In the embodiment of FIGS. 11 and 12 these grooves are shown to be staggered from surface to surface. However, they may be aligned or arranged in any desired relative position. Cover plates 60 and 61, having manifolds 62 and 63, respectively, are associated with base plate 55 to define two rows of nozzles 64 and 65. The liquid conduit 66 and 67 are so positioned as to make it possible to assemble a number of array modules constructed in this manner.

Figure 13:
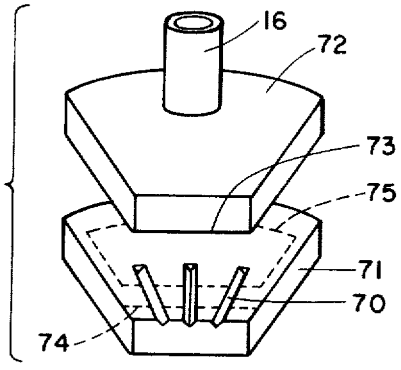
FIG. 13 is a perspective view of the elements, prior to assembly, making up an array apparatus for producing converging fine liquid streams.

Although it will generally be desirable to align the grooves in the base plate to be parallel, this is not necessary as will be seen in the embodiment of FIG. 13 wherein grooves 70, cut in a wedge-shaped base plate 71, are directed to cause the streams ejected from the nozzles thus formed to converge. The cover plate 72 conforms in shape to base plate 71 and is sized so that its forward edge 73 comes up to dotted line 74 to leave a short extension of grooves 70. The borders 75 of the manifold (not shown in cover plate 72) are dotted in to show the manifold position with respect to grooves 70. Although the array apparatus of FIG. 13 is shown to be wedge-shaped, thus permitting the forming of several of these as array modules into a complete assembly, it is also, of course, within the scope of this invention to cut nonparallel grooves in base plates of other configurations.

In ink-jet printing the final disposition of any ink droplets or of any small group of ink droplets is controlled by impressing on the droplet or on a group of droplets an electrical charge, the magnitude and/or polarity of which is determined by a signal derived from a source, e.g., the output of a computer; and then subjecting the droplet or group of droplets to an electrical field generated by droplet directing electrode means. Because it is generally necessary to maintain a minimum spacing between the separate droplet streams, it is not physically possible to provide separate droplet control electrode means for each droplet stream. This then dictates that if separate control over the droplets from stream-to-stream is to be attained, there must be provided within the array itself separate droplet control means for each stream to permit the use of a single charging electrode for the array. The array apparatus of this invention makes possible this separate signal control over each stream as will be shown in FIGS. 14–20.

Figure 14:
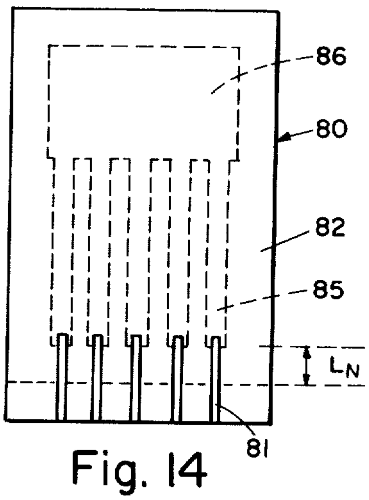
FIGS. 14 and 15 are elevational views of the contact/sealing surfaces of the base plate and of the cover plate of an array apparatus particularly suited for providing an array of fine liquid droplets for ink-jet printing wherein each stream of droplets may be individually and separately controlled using a single droplet directing electrode means.

As will be seen in FIG. 14 which is a top elevational view of the base plate 80, spaced parallel grooves 81 are formed in its contacting surface 82 as previously described. From FIG. 15, which is an elevational view of the underside of the cover plate 83, it will be seen in the contacting/sealing surface 84 of this cover plate there are cut, or otherwise formed, manifold extensions or channels 85 arranged to provide separate streams of liquid to the individual grooves 81 from manifold 86. The positions of these extensions 85 relative to the grooves is indicated by dotted lines in FIG. 14. When manifold extensions 85 are formed as long, narrow channels there is developed a high electrical resistance in the liquid flowing therealong, and this resistance, along with the resistance in the nozzles 87 (FIGS. 16 and 17), makes it possible to electrically insulate electrodes which may be provided for each of the nozzles and hence for each of the streams and the droplets formed therefrom. The length of manifold channels 85 will depend upon such factors as voltage applied (normally about 100 volts or greater), conductivity of the liquid ink, cross sectional area of the grooves, spacing of the grooves, and the like. The actual optimum length may readily be determined for any specific array design.

Figure 15:
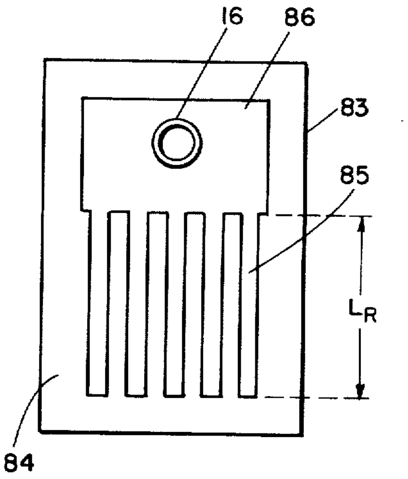
Figure 16:
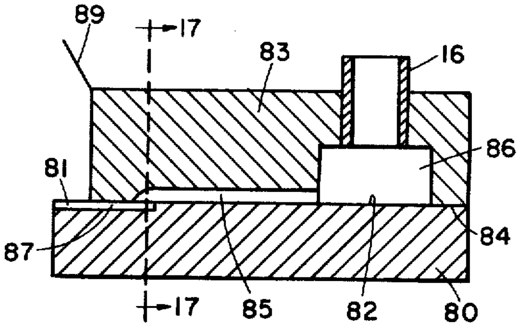
FIG. 16 is a cross section of the assembled array apparatus of FIGS. 14 and 15.
Figure 17:
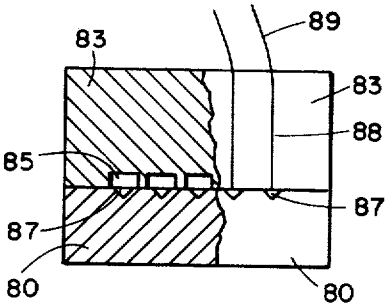
FIG. 17 is an elevational view of the discharge end of the array of FIG. 16 (with a partial cross sectional view through plane 17—17 of FIG. 16) showing the deposition of electrodes on the cover plate and electrical connections thereto for use in an ink-jet printer.

FIGS. 16 and 17 illustrate one form of electrode which may be incorporated into the array apparatus embodiment of FIGS. 14–16. In this arrangement of FIGS. 16 and 17 an electrode 88 is deposited on the discharge end wall of cover plate 83 for each groove, and a lead wire 89 electrically connects each of these electrodes 88 to a signal source. Since ink-jet inks are electrically conductive, contact between the ink and electrode 88 makes it possible to impress the desired voltage signal on the ink and hence on the droplets formed thereof. It is desirable to impress the voltage signal on each liquid stream as near its exit point as possible.

Figure 18:
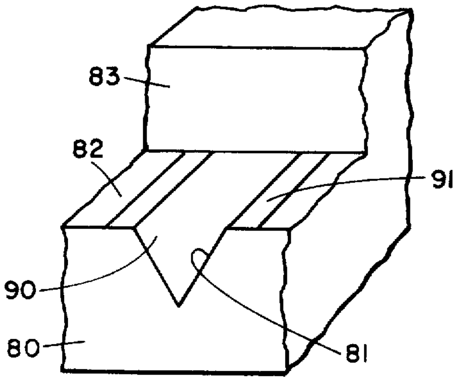
FIG. 18 is a much enlarged perspective view of the discharge end of a base plate groove illustrating the incorporation of an electrode and electrical connection thereto for use in an ink-jet printer.

In the modification of FIG. 18, which shows a much enlarged perspective view of that portion of groove 81 extending forward of nozzle 87, an electrode 90 is provided at the exit or forward end of groove 81, such as by vacuum depositing a very thin layer of a conductive metal over the groove surface and extending sufficiently beyond the groove edge onto surface 82 to permit a lead wire 91 to be attached thereto for connection with a signal source.

Figure 19:
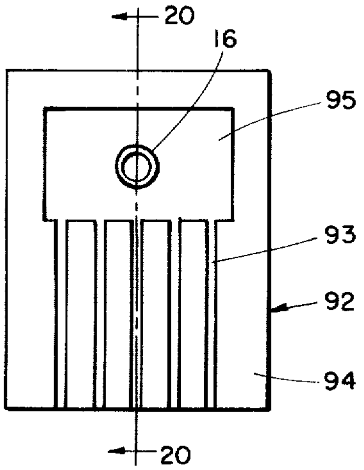
FIG. 19 is an elevational view of the contacting/sealing surface of a base plate of another embodiment of an array apparatus constructed in accordance with this invention and suitable for separately controlling the droplet streams.
Figure 20:
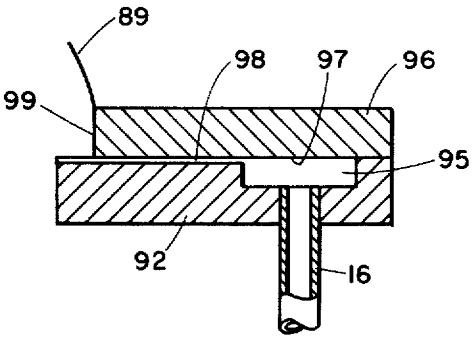
FIG. 20 is the cross section of an array incorporating the base plate of FIG. 19 cut through a plane such as 20—20 of FIG. 19.

FIGS. 19 and 20 illustrate another embodiment of the array apparatus constructed in accordance with this invention and being suitable for effecting separate control over the droplets in the individual streams. The base plate 92, shown in the view of FIG. 19, has elongated grooves 93 formed in its contacting/sealing surface 94 which extend to manifold 95 which is also cut in the base plate. As shown in FIG. 20, the cover plate 96 has a flat contacting sealing surface 97 which forms elongated nozzles 98 with the base plate grooves. The length of grooves 93 is determined by a consideration of the same factors as those stated above for manifold channels 85 of FIGS. 14–17. Separate electrodes 99 are deposited on the discharge end wall of cover plate 96 and are connected to lead wires 89 as described in connection with FIGS. 16 and 17.

Figure 21:
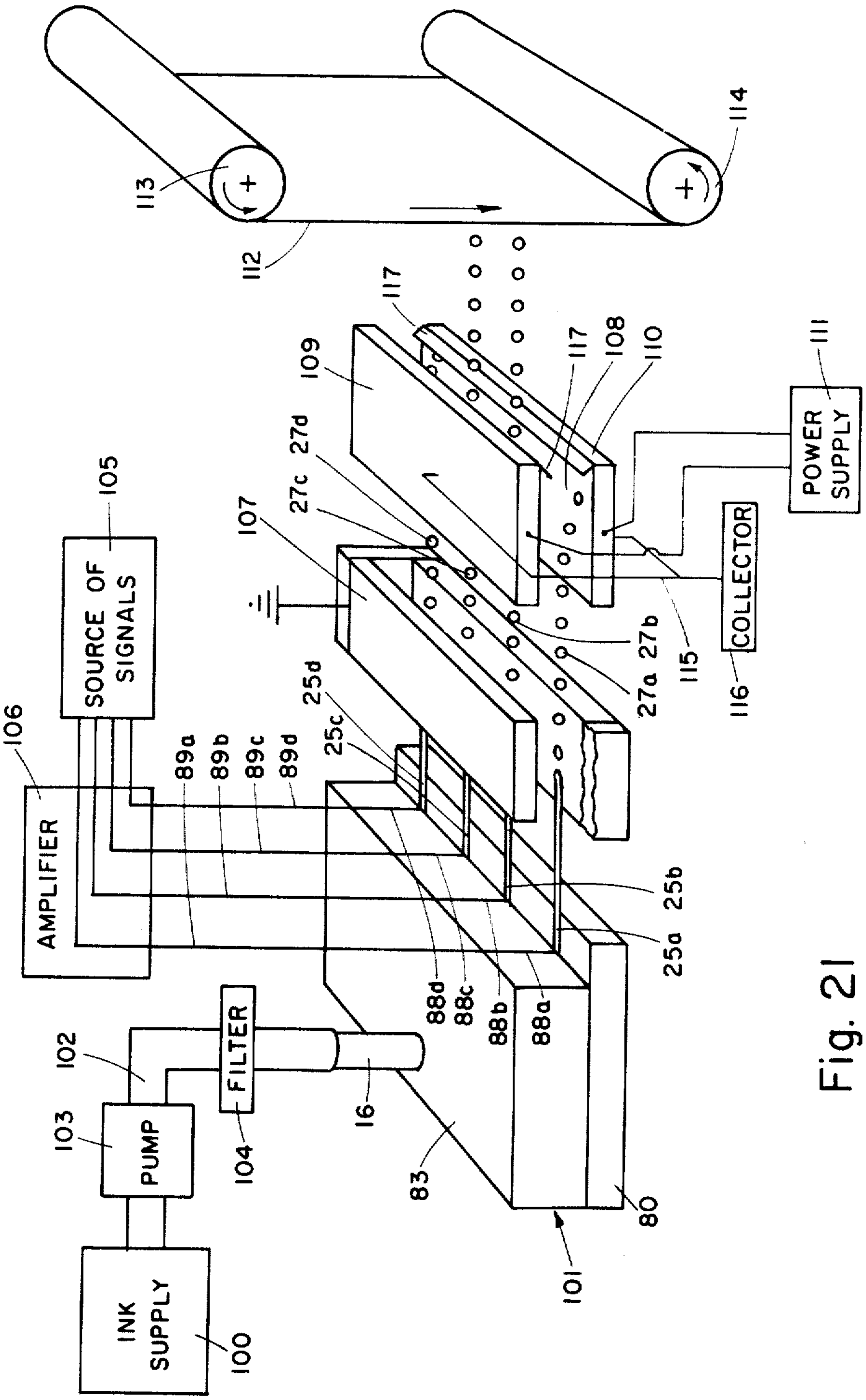
FIG. 21 is a perspective view, with some components shown diagrammatically, of an ink-jet printer constructed in accordance with this invention.

FIG. 21 illustrates an ink-jet printing system using the array apparatus of FIGS. 14–17. The embodiments of FIGS. 18 and 19 could be used equally as well. Ink from an ink supply 100 is delivered to the array module 101 through conduit 102 which incorporates pump 103 and filter 104. The signals to control the charges to be placed upon the droplets *27a–27d* are provided by a signal source 105 through amplifying means 106 by way of the respective lead wires *89a–89d* through electrodes *88a–88d* to the ink in the manifold channels (e.g., channels 85 of FIG. 16) leading into the nozzles (e.g., nozzles 87 to FIG. 16) which give rise to the liquid streams *25a–25d* which in turn break up into drops at drop formation points located within the common charging electrode 107, shown to be grounded. By virtue of the different electrical signals delivered to the ink in each stream and of the use of common charging electrode 107, the individual droplets or small groups of droplets (e.g., groups of three or four) carry distinctive charges which may be zero or a predetermined positive or negative charge. The charged droplets are then directed through an electrostatic field 108 defined between electrodes 109 and 110 connected to power supply 111. Depending upon the charge they carry, the droplets are either directed onto a predetermined site on receptor surface 112 (which is generally maintained in continuous motion such as by rotating rolls 113 and 114) or they are diverted away from receptor surface 112 by known means such as by making electrodes 109 and 110 porous and pulling a vacuum on them to draw off the liquid from them such as by vacuum lines 115 leading to a suitable collector 116. Electrodes 109 and 110 are preferably equipped with angled droplet cut-off means 117 which present a razor-sharp edge facing the direction of droplet travel.

The ink-jet system shown in FIG. 21 illustrates in a general way how the array apparatus of this invention may be used in an ink-jet printer. If, for example, the Hertz method of ink-jet printing is used (see for example U.S. Pat. Nos. 3,416,153 and 3,916,421), small groups (e.g., four) droplets in the stream are either left uncharged or given a predetermined charge. The droplet directing electrode means permits the uncharged droplets to strike the receptor surface while causing the charged droplets to be caught and collected. If the Sweet method of ink-jet printing is used, (see U.S. Pat. No. 3,596,275) then variable electrical signal values representative of the desired diflections are impressed upon the individual droplets. In its passage through the electrostatic field 108 a desired trajectory, depending upon the charge it carries, is given each of these droplets, and such trajectory determines the final location of the droplet, e.g., on the receptor surface, or into ink collector means 116.

There are, of course, many embodiments, modifications and variations in ink-jet printing systems operating on these principles and it will be apparent to one skilled in the art how to employ the array apparatus of this invention in these various systems.

It will be seen that the array apparatus of this invention meets the objects set forth. By forming the required nozzles between the grooved base plate and the cover plate in accordance with this invention it is possible to more accurately control the size of each nozzle, its positioning relative to adjacent nozzles and its internal surface characteristics than is possible by drilling orifices in a plate or affixing a plurality of capillaries in spaced relation. The result of this attainment of nozzle size and spacing uniformity is the achievement of improved droplet alignment so necessary to ink-jet array printing. The cost of forming the array apparatus of this invention is below that involved in presently used array construction techniques, for surface machining and grooving equipment as well as molding and etching techniques are available. Moreover, because the alignment of the liquid streams is solely dependent upon the accuracy with which the grooves are cut in the base plate surface, it may be possible in those embodiments wherein the cover and base plates are not permanently sealed together to periodically open up the array apparatus, e.g., by removing the clamps 17 and swinging up the cover plate on hinges 18 (FIG. 4), to clean the grooves and hence the nozzles and then to replace the cover plate without requiring any adjustments. Since the array apparatus may be made to provide closely spaced streams of a conductive liquid which can be electrically insulated from each other it is particularly suited for ink-jet array printing systems.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:

1. An apparatus for providing an array of fine liquid streams which break up at drop formation points to form streams of liquid droplets, comprising the combination (a) base plate means having a plurality of grooves spaced according to a predetermined pattern in at least one contacting/sealing surface thereof;

(b) cover plate means engageable with said at least one contacting/sealing surface of said base plate means to form with said grooves a plurality of nozzles extending along at least a portion of the length of said grooves wherein said base plate means and said cover plate means are maintained in liquid sealing contact and said base plate means and said grooves therein extend beyond the discharge end of said nozzles to provide groove extensions;

(c) liquid manifold means communicating with said grooves to supply liquid under pressure to said nozzles; and (d) separate electrode means associated with each liquid stream arranged to contact said liquid stream in said groove extension.

2. An apparatus in accordance with claim 1 wherein said grooves are parallel.

3. An apparatus in accordance with claim 1 wherein said grooves are essentially V-shaped.

4. An apparatus in accordance with claim 1 wherein said base plate means and said cover plate means are joined through hinging means which permit exposing the contacting surfaces for cleaning.

5. An apparatus in accordance with claim 1 wherein said nozzles have a cross sectional area between about $2\times10^{-5}$ mm$^2$ and about $8\times10^{-3}$ mm$^2$.

6. An apparatus in accordance with claim 1 wherein said nozzles have an aspect ratio between about 2 and about 10.

7. An apparatus in accordance with claim 1 wherein said manifold means are cut in said cover plate means.

8. An apparatus in accordance with claim 1 wherein said manifold means are cut in said base plate means.

9. An apparatus in accordance with claim 1 wherein said base plate means and said grooves therein extend beyond the discharge end of said nozzles.

10. An apparatus in accordance with claim 1 wherein said cover plate means has grooves of the same configuration, size and spacing as said grooves of said base plate means and are aligned therewith, whereby said nozzles are formed by the resulting facing grooves.

11. An apparatus in accordance with claim 1 wherein said base plate means has a plurality of said grooves in opposite surfaces thereof and said cover plate means engage both of said surfaces whereby there are formed a plurality of nozzles in vertically and horizontally spaced relationship.

12. An apparatus in accordance with claim 1 wherein said base plate means is formed of crystalline silicon and said grooves are etched in said surface.

13. An apparatus in accordance with claim 1 wherein said base plate is formed of a synthetic resin material and said grooves are molded in said surface.

14. An apparatus in accordance with claim 1 wherein said base plate means and said cover plate means are permanently adhered in sealing relationship.

15. An apparatus in accordance with claim 5 wherein said base plate means is formed of a metal and said grooves are machined in said surface.

16. An apparatus in accordance with claim 1 wherein stream defining means are included to provide said liquid to said nozzles as individual streams, the length of said streams and the spacing between them being such as to electrically isolate each stream and each stream of liquid droplets formed therefrom.

17. An apparatus in accordance with claim 16 wherein said stream defining means comprise separate manifold channels for said nozzles or nozzles of the requisite length and spacing.

18. An apparatus in accordance with claim 17 wherein said separate electrode means are deposited on the discharge end wall of said cover plate means and are arranged to contact said liquid streams at the discharge end of said nozzles.

19. An ink-jet array printing apparatus, comprising in combination

- (a) array forming means to provide an array of fine liquid streams which break up at drop formation points to form streams of liquid droplets, said array forming means comprising
  - (1) base plate means having a plurality of grooves spaced according to a predetermined pattern in at least one contacting/sealing surface thereof
  - (2) cover plate means engageable with said at least one surface of said base plate means to form with said grooves a plurality of nozzles extending along at least a portion of the length of said grooves, said base plate means and said cover plate means being maintained in liquid sealing contact; and
  - (3) liquid manifold means communicating with said grooves to supply liquid under pressure to said nozzles
- (b) receptor surface means;
- (c) electrical signal source means;
- (d) signal control means to impress an electrical charge on at least some of said droplets of said streams; and
- (e) droplet directing electrode means to control the direction of travel and ultimate disposition of at least some of said droplets of each of said streams onto said receptor surface means.

20. An ink-jet array printing apparatus in accordance with claim 19 wherein said grooves are parallel and essentially V-shaped in cross section.

21. An ink-jet array printing apparatus in accordance with claim 19 wherein said base plate means and said grooves therein extend beyond the discharge end of said nozzles.

22. An ink-jet array printing apparatus in accordance with claim 19 wherein said base plate means is formed of crystalline silicon and said grooves are etched in said surface.

23. An ink-jet array printing apparatus in accordance with claim 19 wherein said base plate means is formed of a metal and said grooves are machined in said surface.

24. An ink-jet array printing apparatus in accordance with claim 19 wherein said base plate means is formed of a synthetic resin material and said grooves are molded in said surface.

25. An ink-jet array printing apparatus in accordance with claim 19 wherein in said base plate means and said cover plate means are permanently adhered in sealing relationship.

26. An ink-jet array printing apparatus in accordance with claim 19 wherein stream defining means are included to provide said liquid to said nozzles as individual streams, the length of said streams and the spacing between them being such as to electrically isolate each stream and each stream of liquid droplets formed therefrom.

27. An ink-jet array printing apparatus in accordance with claim 26 including separate electrode means associated with each of said liquid streams.

28. An ink-jet array printing apparatus in accordance with claim 27 wherein said base plate means and said grooves therein extend beyond the discharge end of said nozzles to provide groove extensions and said separate electrode means are arranged to contact said liquid streams in said groove extensions.

29. An ink-jet array printing apparatus in accordance with claim 27 wherein said signal control means comprises means to supply separate signals from said signal source to said separate electrodes means and common charging electrode means through which said liquid streams pass and in which said drop formation points are located.

30. An ink-jet array printing apparatus in accordance with claim 27 wherein said stream defining means comprise separate manifold channels for said nozzles or nozzles of the requisite length and spacing.

31. An ink-jet array printing apparatus in accordance with claim 30 wherein said separate electrode means are deposited on the discharge end wall of said cover plate means and are arranged to contact said liquid streams discharged from said nozzles.

32. An apparatus for providing an array of fine liquid streams which break up at drop formation points to form streams of liquid droplets, comprising the combination (a) base plate means having a plurality of grooves spaced according to a predetermined pattern in at least one contact/sealing surface thereof;

(b) cover plate means engageable with said at least one contacting/sealing surface of said base plate means to form with said grooves a plurality of nozzles extending along at least a portion of the length of said grooves wherein said base plate means and said cover plate means are maintained in liquid sealing contact and said base plate means and said grooves therein extend beyond the discharge end of said nozzles to provide groove extensions;

(c) liquid manifold means communicating with said grooves to supply liquid under pressure to said nozzles; and (d) electrode means associated with said liquid streams.

* * * * *